(12) United States Patent
Usami

(10) Patent No.: US 6,205,246 B1
(45) Date of Patent: Mar. 20, 2001

(54) COLOR TRANSFORMATION METHOD UNDER TWO DIFFERENT CONDITIONS

(75) Inventor: Yoshinori Usami, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 08/998,946

(22) Filed: Dec. 29, 1997

(30) Foreign Application Priority Data

Dec. 26, 1996 (JP) .................................................. 8-348824

(51) Int. Cl.⁷ ...................................................... G06K 9/00
(52) U.S. Cl. ............................. 382/167; 358/518; 358/1.9
(58) Field of Search ................................... 382/167, 162; 358/518, 1.9, 500, 504, 515, 520–521, 530; 395/109; 345/431, 153–154

(56) References Cited

U.S. PATENT DOCUMENTS

| | | | |
|---|---|---|---|
| 3,612,753 | * 10/1971 | Korman | 178/5.2 A |
| 5,008,742 | * 4/1991 | Shigaki et al. | 358/79 |
| 5,438,649 | * 8/1995 | Ruetz | 395/109 |
| 5,539,540 | * 7/1996 | Spaulding et al. | 358/518 |
| 5,583,666 | * 12/1996 | Ellson et al. | 358/518 |
| 5,696,839 | * 12/1997 | Siegeritz | 382/162 |
| 5,724,442 | * 3/1998 | Ogatsu et al. | 382/167 |

FOREIGN PATENT DOCUMENTS

| | | | |
|---|---|---|---|
| 0 541 870 A1 | 5/1993 | (EP) | H03M/1/10 |
| 0 584 019 A2 | 2/1994 | (EP) | H04N/1/46 |
| 0 758 181 A2 | 2/1997 | (EP) | H04N/1/60 |
| 0 851 669 A2 | * 7/1998 | (EP) | H04N/1/60 |
| 60-112042 | 6/1985 | (JP) | G03F/3/08 |
| 3131920 | 6/1991 | (JP) | G06F/3/12 |
| 4196676 | 7/1992 | (JP) | H04N/1/40 |
| 4217167 | 8/1992 | (JP) | H04N/1/40 |
| 4362869 | 12/1992 | (JP) | H04N/1/40 |

* cited by examiner

Primary Examiner—Andrew W. Johns
Assistant Examiner—Ishrat Sherali
(74) Attorney, Agent, or Firm—Sughrue, Mion, Zinn, Macpeak & Seas, PLLC

(57) ABSTRACT

The present invention has as an object providing a color transforming method by which transformation can be effected easily making maximum use of the reproduction range and without causing any distortions in a color space while maintaining color and gradation balances between different conditions (of device, medium or reproducing condition) in different ranges of color reproduction, which has been difficult to satisfy in the prior art. This object can be attained by a color transforming method which performs color correction between reproduced images under different conditions.

17 Claims, 7 Drawing Sheets

Printing condition B

Printing condition A

Printing condition A

Luminance range limit & relation curve

ENIV (Printing condition A)

ENIV (Printing condition B)

Final Relation A → B

COLOR TRANSFORMATION METHOD UNDER TWO DIFFERENT CONDITIONS

BACKGROUND OF THE INVENTION

This invention relates to a color transforming method which, under two different conditions such as the use of different media, devices or reproducing conditions, performs color correction and transformation such that an image reproduced under a given condition can be reproduced optimally under the other condition.

In hard copies such as those produced by printing or soft copies such as those produced by CRT display devices, colors are generally reproduced by performing area (dot percent) or density modulation of CMYK or RGB on a support. Many methods have been proposed with a view to achieving calorimetric agreements using such devices and media. Aside from the possible problem with precision, two methods are commonly known, one being the direct performance of mapping transformation as described in Unexamined Published Japanese Patent Application No. 131920/1991 which makes use of color transforming tables that are predetermined for hard copies produced with a specified printer and under specified printing conditions, and the other method involving the determination of the most likely solution of a masking coefficient such as to achieve an agreement between calorimetric values under two conditions as described in Unexamined Published Japanese Patent Application No. 362869/1992.

However, in general system configurations, more diverse variations are desired on the basis of calorimetric reproduction. One of them is an operation by which an image reproduced under a certain condition (e.g. device, medium or reproducing condition) is transformed in a way that best matches another condition which varies significantly in terms of color reproducing characteristics. In the case of prints which are most common hard copies, the color reproducing characteristics are largely dependent on the properties of the color material (e.g. ink) or support (e.g. paper) used and in order to effect transformation between two different color reproducing conditions such that the range of color reproduction under a different condition can be utilized most effectively while preserving or appropriately correcting color tones and gradations, much time and efforts are currently required on a trial-and-error basis. For example, if the ink or paper used under a certain color reproducing condition is changed, the range of color reproduction may occasionally vary between the two cases. If this occurs, it is necessary that the calorimetric reproduction of the initial color reproducing condition be preserved as much as possible while effecting mapping to a second color reproducing space associated with the different ink or paper. To meet this need, color compression is performed if the second color reproducing space is narrower than the initial one and color extension is performed in the opposite case. The color reproducing job currently performed in the printing industry is such that the condition where a color of interest such as gray does not change at limited sacrifice of other colors is determined by setting up a scanner and other devices on a trial-and-error basis, namely, requiring much time and efforts on the side of the operator.

With a view to supplementing this skill, various apparatus and algorithms have been proposed to date but no satisfactory quality or results have been attained. See, for example, Unexamined Published Japanese Patent Application No. 112042/1985 which proposes a method that uses an apparatus capable of simulating the finish of prints on a CRT so as to determine the final condition while making comparison under differing printing conditions. However, this method has so many degrees of freedom in adjustment that it is difficult to determine the optimal final condition; what is more, it is inherently impossible for the colors of soft copies such as those obtained from CRTs to have complete agreement with the colors of hard copies such as prints, so tremendous time and efforts are required to match the reproduction from a CRT with a print under specific conditions.

Another inherent problem is that when presumably optimal color transformation is to be performed under differing conditions in such a situation that complete color space agreement is unlikely to occur, the range of color reproduction need be compressed, extended or transformed between the two conditions; however, these operations often depend on the characteristics of the color reproducing space and there is no general optimum solution.

In color space compression and extension, methods are known and often attempted to preserve, compress or extend the chroma, hue or lightness in color matching spaces such as an Lab space; however, if the range of color reproduction changes greatly between two conditions, the mismatch in graphic patterns is substantial and requires a huge burden on calculations and, in addition, there is a tradeoff between the reproduction of gradations and the fidelity in color reproduction; hence, none of the techniques currently employed for color space compression and extension have proved to be completely satisfactory from the viewpoint of practical application (see Unexamined Published Japanese Patent Application Nos. 196676/1992 and 217167/1992). Thus, color space compression and gradation transformation for the case where the color reproducing characteristics differ significantly with the characteristics of the color material and the support are not considered at all in the prior art and in almost all cases it is difficult to produce an optimally transformed image.

Matching between different ranges of color reproduction or gradation reproduction characteristics in the process of color transformation between different conditions as between different hard copies (e.g. prints) is always a topic of discussion in the prior art; however, no satisfactory means of solution has yet been attained. Hence, it is strongly needed to develop a method that not only solves the stated difficulty of the prior art but also assures high quality as the result of simpler calculations.

SUMMARY OF THE INVENTION

The present invention has been accomplished under these circumstances and has as an object providing a color transforming method by which transformation can be effected easily making maximum use of the reproduction range and without causing any distortions in a color space while maintaining color and gradation balances between different conditions (of device, medium or reproducing condition) in different ranges of color reproduction, which has been difficult to satisfy in the prior art.

This object can be attained by a color transforming method which performs color correction between reproduced images under different conditions, the method comprising the steps of:

1) calculating (predicting) the colorimetric color reproducing characteristics under each condition;
2) determining equivalent neutral attribute data from each of s aid color reproducing characteristics;
3) determining the mapping of said equivalent neutral attribute data with respect to lightness, luminance or light quantity;

4) using the scale of said lightness, luminance or light quantity as a gradation correction curve;

5) determining, on the basis of a maximum and a minimum device value that can be reproduced (theoretically) under each of said conditions, the range over which mapping from said equivalent neutral attribute data to the gradation correction curve is possible;

6) varying the characteristics of the gradation correction curves for said two conditions so as to change the intensity of the mapping function and determine the function of transformation between gradation curves; and 7) combining the functions of mapping from the equivalent neutral attribute data to the gradation correction curve under said (any) two conditions with the intermediary of the determined function of transformation between gradation curves, thereby constructing a function of one-to-one mapping for each color component between the equivalent neutral attribute data under said (any) two conditions, for example, from C to C', M to M', Y to Y' and K to K' between equivalent neutral ink values.

Preferably, the type of said conditions is at least one condition selected from the group consisting of device condition, media condition and reproducing condition.

It is also preferred that said equivalent neutral attribute data is an equivalent neutral density (END), equivalent neutral luminance or equivalent neutral ink value.

In another preferred embodiment, said maximum device value is a maximum density under each of said conditions in printing and said minimum device value is a paper support or supporting paper in printing.

Preferably, an optimum function of transformation between the gradation curves for said two conditions is determined from the ranges of said gradation correction curves and the ratio of their compression.

It is also preferred that an image reproduced under (any) one condition is transformed to an image of reproduction under (any) other condition using said mapping function for each color component.

In another preferred embodiment, the relationship of mapping between the equivalent neutral attribute data and the gradation correction curve under each of said conditions is stored as a function library, accessed prior to processing (at any suitable time) and processed by the respective steps 1)–7).

DETAILED DESCRIPTION OF THE INVENTION

We will now describe more specifically the color transforming method of the invention with reference to the preferred embodiments shown in the accompanying drawings.

Figure 1:
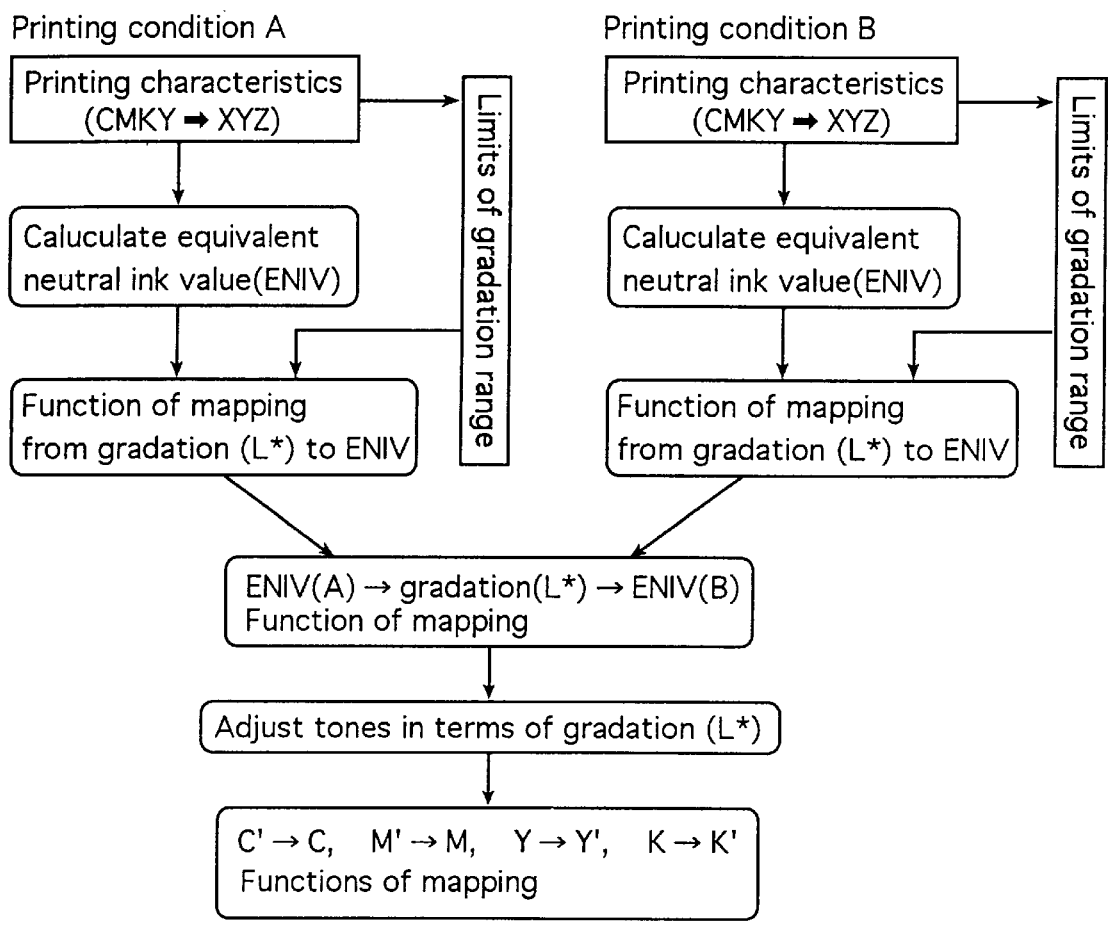
FIG. 1 is a flow chart showing an example of the general flow of the color transforming method of the invention.

FIG. 1 is a flow chart showing a specific example of the general flow of the color transforming method of the invention. The invention will now be described more specifically with reference to the flow chart in FIG. 1. While the following description of a specific example of the invention is based on printing as a typical case, it should be understood that the invention is in no way limited to this particular case.

In printing, the gamut that can be reproduced (color reproducing characteristics) and the gradation reproducing characteristics are largely dependent on various factors including the support (paper base or the like) on which an image is to be reproduced, for example, the device such as a printing press, the medium such as ink or paper base and the printing condition such as diverse reproducing conditions. In this case, in order to establish a mapping relationship that enables color space matching, color space compression and extension must be considered but this is by no means an easy job to accomplish.

Hence, according to the invention, as shown in FIG. 1, prints or simulating hard copies (CMYK) under two conditions of interest (which are hereinafter referred to as "printing conditions A and B") are first predicted and calculated for their colorimetric color reproducing characteristics (printing characteristics XYZ). Subsequently, equivalent neutral attribute data such as equivalent neutral ink values (hereunder abbreviated as ENIV), equivalent neutral densities (END) and equivalent neutral luminances are determined from the calorimetric color reproducing characteristics obtained under the respective printing conditions A and B. Thereafter, the mapping between the equivalent neutral attribute data such as ENIV and END and a gradation curve (e.g. L* or Y) as typified by the scale of luminance or light quantity is determined. With the intermediary of the thus obtained gradation curves for the respective printing conditions A and B, ENIV to ENIV or END to END transformation is performed between the conditions A and B so that device data (CMYK, RGB) are mapped to device data (C'M'Y'K', R'G'B') to complete the intended transformation.

At the same time, the ranges of the gradation curves are determined using limits such as a maximum device value (e.g. maximum density) and a minimum device value (e.g. paper base) that can be reproduced (theoretically) for gradation under each of the conditions A and B, and the characteristics of the gradation curves are so varied as to change intensity of the mapping function and determine the function of transformation between the gradation curves, thereby effecting simultaneous mapping transformation.

Let us first describe the step of predicting and calculating a colorimetric color space (e.g. Lab or XYZ space) representing colorimetric color reproducing characteristics from printing device data CMYK under two printing conditions A and B.

In ordinary printing processes, the general practice is printing color patches and the like, performing colorimetry, and applying known techniques such as an error minimizing maximum likelihood square method and the use of matrices (as in a masking method) to construct a function of mapping (LUT) between the printing device data (CMYK) and the calorimetric color space (e.g. Lab or XYZ).

The use of a maximum likelihood square method will proceed as follows. If the mapping relationship of calorimetric values XYZ with device data CMYK is partly known by measurement or some other method, the relationship between a colorimetric value X and CMYK can be immediately written as VX=MX·AX, with the respective terms being defined by the following equations (1). Similarly, the relationship between a colorimetric value Y and CMYK and that between a colorimetric value Z and CMYK can be written as VY=MY·AY and VZ=MZ·AZ but details of these expressions need not be given here:

$$\begin{bmatrix} X_1 \\ X_2 \\ \vdots \\ X_k \end{bmatrix} = VX, \begin{bmatrix} 1 & C_1 & M_1 & Y_1 ... \\ 1 & C_2 & M_2 & Y_2 ... \\ \vdots & \vdots & \vdots & \vdots \\ 1 & C_k & M_k & Y_k ... \end{bmatrix} = MX, \begin{bmatrix} a0 \\ a_1 \\ \vdots \\ a_n \end{bmatrix} = AX \quad \text{eq. (1)}$$

If the error in the determination of a most likely solution AX is written as e and the transpose of the matrix V as $V^T$, the error e can be expressed by the following equation (2):

$$e = \|VX - MX \cdot AX\|^2 = (VX - MX \cdot AX)^{T^*}(VX - MX \cdot AX) \quad (2)$$

If the error is dealt with as a minimization problem, the solution AX can be determined by the following equation (3):

$$\partial e / \partial AX = \partial \{\|VX - MX \cdot AX\|^2\} / \partial AX = \quad (3)$$
$$-2MX^T(VX - MX \cdot AX) = 0 \therefore AX = (MX^T \cdot MX) \cdot MX^T \cdot VX$$

Thus, the polynomial coefficient AX of mapping from CMYK to the calorimetric values XYZ under the printing conditions A and B can be determined by the eq. (3) and using this coefficient AX, one can consecutively calculate the values of mapping a given CMYK to the colorimetric values XYZ.

Needless to say, the above-described procedure is also applicable to a hard copy producing apparatus (digital printer) and a CRT which simulate printing. The color reproducing characteristics under the condition A which is the reference for reproduction and those under the condition B which is to be reproduced can both be determined by the exemplary method described above.

It should, however, be noted that this is not the sole method of determining the color reproducing characteristics for the respective conditions A and B and any known methods may be adopted as long as they are capable of predicting and calculating calorimetric color reproducing characteristics by determining calorimetric values XYZ, Lab and the like from device data CMYK, RGB and the like.

The next step to be performed in the invention is determining equivalent neutral (device) attribute data from the colorimetric color reproducing characteristics. From the calorimetric color reproducing characteristics determined in step 1) for the conditions A and B, the combination of CMY ink values for the neutral case (such as where a*=b*=0 in a Lab color matching system) is determined (the combination shall be referred to as the "equivalent neutral ink value" in the invention) and the thus determined combination is used as equivalent neutral device data.

It should be noted that the thus determined equivalent neutral device data is just one example of the "equivalent neutral attribute data" to be used in the invention and other examples include an equivalent neutral density, equivalent neutral luminance, etc.

Figure 8:
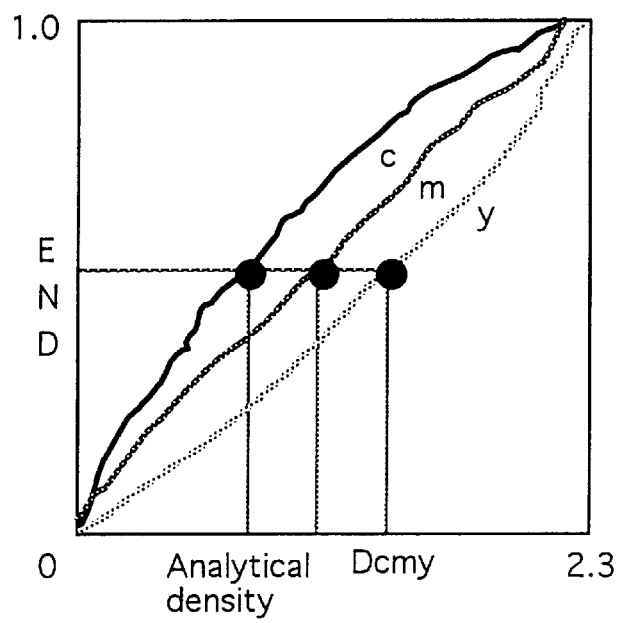
FIG. 8 is a diagram showing the concept of the equivalent neutral density used in the invention.

It should also be noted that the term "equivalent neutral density" (commonly abbreviated as END) generally means a scalar quantity corresponding to a gray balance at which a mixture of certain densities c, m and y gives a neutral color or gray. This may be better understood from FIG. 8 which shows that given analytical densities of c, m and y under a certain condition, only one set of densities that provide a gray balance exists at any point (this relationship may be described as "linear independency") and the combination of such densities is represented by END. Therefore, END is unitless and may be expressed in any desired manner; in FIG. 8, END corresponding to the combination at a maximum density that can be reproduced may be normalized to 1.0. Alternatively, the correspondence may be to the change in lightness L* as will be described hereinafter and yet the result is inherently END. If the concept of END is expanded, a similar relationship of mapping can be established for the combination of CMY ink values that provide gray. This may be called END in the broad sense of the term; however, in the present invention, the CMY ink values that provide gray shall be defined as "equivalent neutral ink value (ENIV)" by analogy from END. Similarly, in the present invention, the luminances of RGB that provide gray on CRT and the like shall be called "equivalent neutral luminance".

If the function of forward mapping from CMY to Lab is written as F(CMY), there may be a case where the solution in reverse direction, i.e., $F^{-1}$(Lab) cannot be obtained by mathematical expressions. A method that is generally applicable to a case like this is "consecutive approximation" which is described below.

Figure 9:
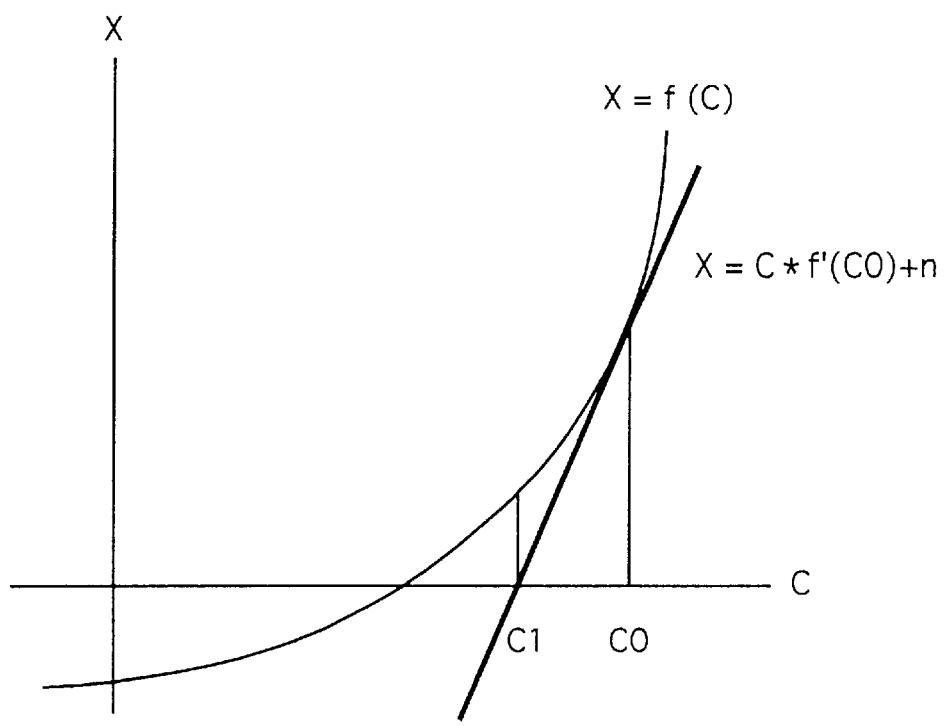
FIG. 9 illustrates how a consecutive approximation method is applied to the invention in an exemplary case of one-dimensional mapping.
Figure 10A:
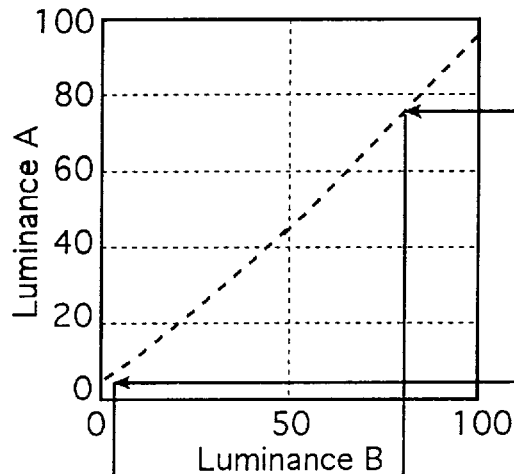
FIGS. 10A–10C illustrate another exemplary case of combining two mapping functions in the color transforming method of the invention.
Figure 10B:
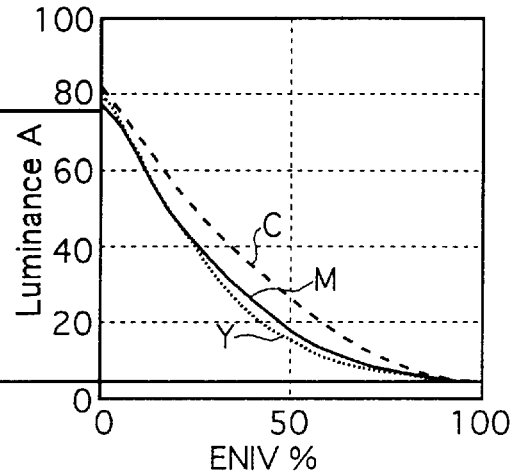
Figure 10C:
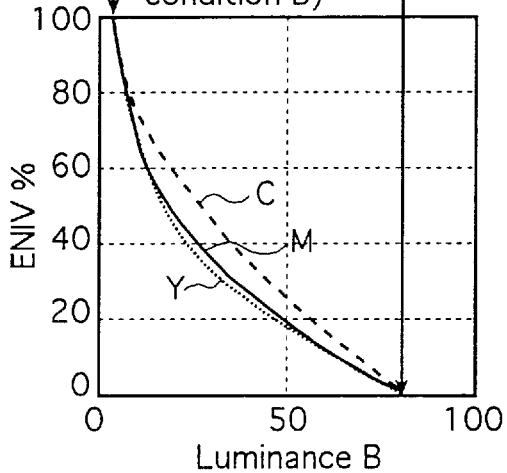
Figure 10D:
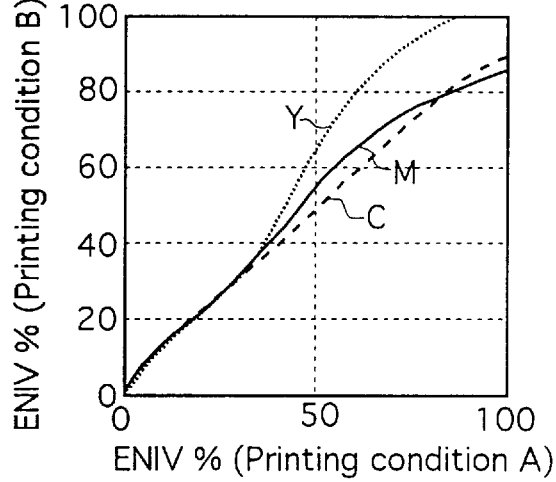
FIG. 10D is a graph showing an example of the resulting mapping function.

For the sake of convenience, the description starts with the simple case of one-dimensional mapping X=f(C). Referring to FIG. 9, suppose that the initial value is taken at $C_0$ and the differential at that point is written as $f^{-1}(C_0)$. Then, the tangential line can be expressed by $X = C*f^{-1}(C_0)+n$. Substituting $n = f(C_0) - C_0 * f^{-1}(C_0)$, the expression can be rewritten as:

$$X = C*f^{-1}(C_0) + f(C_0) - C_0 * f^{-1}(C_0) \quad \text{eq. (4)}$$

Consequently, the value of C is determined as follows:

$$\therefore C = \{X + C_0 * f^{-1}(C_0) - f(C_0)\} / f^{-1}(C_0)$$
$$= \{X - f(C_0)\} / f^{-1}(C_0) + C_0$$

The calculation for determining C is repeated as follows:

$$C_1 = \{X - f(C_0)\} / f^{-1}(C_0) + C_0$$

-continued $$C_2 = \{X - f(C_1)\}/f^{-1}(C_1) + C_1$$
$$\vdots$$
$$C_n = \{X - f(C_{n-1})\}/f^{-1}(C_{n-1}) + C_{n-1}$$

and the process ends when $|C_n - C_{n-1}| < \epsilon$.

In the case of three-dimensional mapping, forward mapping from CMY to Lab(xyz) may be expressed by the following functions:

$$f(C, M, Y) = x$$
$$g(C, M, Y) = y$$
$$h(C, M, Y) = z$$

Hence, their partial derivatives are represented by the following matrix expression (5):

$$\begin{bmatrix} \partial f/\partial C & \partial f/\partial M & \partial f/\partial Y \\ \partial g/\partial C & \partial g/\partial M & \partial g/\partial Y \\ \partial h/\partial C & \partial h/\partial M & \partial h/\partial Y \end{bmatrix} = \partial(f, g, h)/\partial(C, M, Y) = BM \quad \text{eq. (5)}$$

From eqs. (4) and (5), the mapping function of interest can be determined by the following equation (6):

$$\begin{bmatrix} x \\ y \\ z \end{bmatrix} = BM \begin{bmatrix} C \\ M \\ Y \end{bmatrix} + \begin{bmatrix} f(C_0, M_0, Y_0) \\ g(C_0, M_0, Y_0) \\ h(C_0, M_0, Y_0) \end{bmatrix} - BM \begin{bmatrix} C_0 \\ M_0 \\ Y_0 \end{bmatrix} \quad \text{eq. (6)}$$

$$\begin{bmatrix} C \\ M \\ Y \end{bmatrix} = BM^{-1} \begin{bmatrix} x \\ y \\ z \end{bmatrix} - BM^{-1} \begin{bmatrix} f(C_0, M_0, Y_0) \\ g(C_0, M_0, Y_0) \\ h(C_0, M_0, Y_0) \end{bmatrix} + \begin{bmatrix} C_0 \\ M_0 \\ Y_0 \end{bmatrix}$$

where the convergence condition is $|(C,M,Y)-(C_0,M_0,Y_0)| < \epsilon$.

Thus, the color-matching values of CMY can be determined from the values of xyz in the Lab space. It is interesting to note that even a solution for irregular lattice point data which are not on the mapping of a lookup table (LUT) for mapping from normal CMYK to Lab can be easily determined by using the above-described consecutive approximation method. By applying inverse calculations and the like using the consecutive approximation method to the abnormal lattice space, the equivalent neutral ink values (ENIV) can be easily determined as equivalent neutral device data. In this case, achromatic linear regions in the space of achromatic values are preferably determined in order to achieve accurate determination of ranges over which the desired color reproduction is possible in printing and the like. Briefly, those regions where the quantities of digital device data can be reproduced linearly are determined accurately and used as effective ranges. As for the method of removing the nonlinear printing areas in terms of achromatic values, reference may be had to the disclosure in the specification of Japanese Patent Application No. 304883/1996.

Figure 4A:
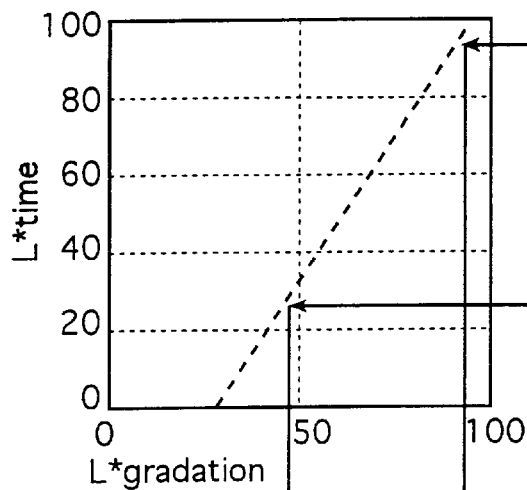
FIGS. 4A–4C illustrate an exemplary case of combining two mapping functions in the color transforming method of the invention.
Figure 4B:
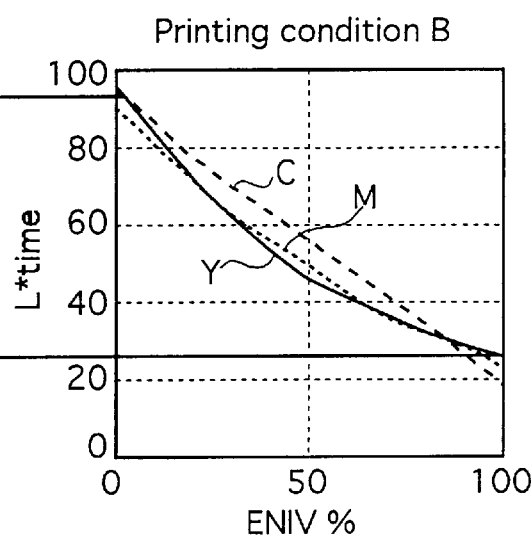
Figure 4C:
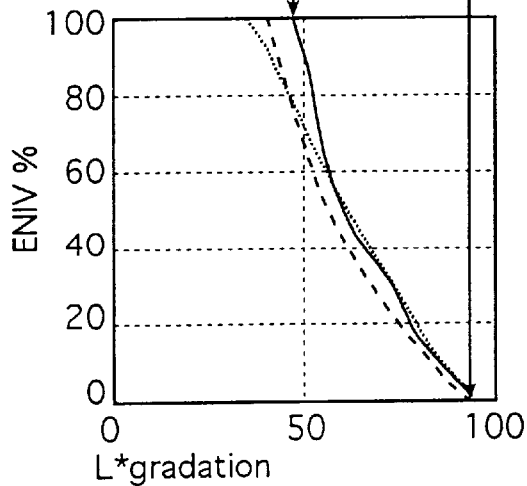

In the next step, the thus obtained equivalent neutral device data are mapped to lightness (L*), light quantity or luminance (Y) or any other parameter. As a result, the relationship of mapping between the equivalent neutral device data and L* (a*=b*=0) which represents lightness in the neutral range of color reproduction is determined for each of the conditions A and B. Since a*=b*=0, this relationship can eventually be identified as the correlationship between lightness L* gradation or light quantity (luminance) Y gradation and the CMY ink value. In the drawings, FIGS. 4B and 4C represent this correlationship, namely, the relationship between equivalent neutral ink value (ENIV) and lightness (L*) under printing conditions B and A, respectively.

Figure 2A:
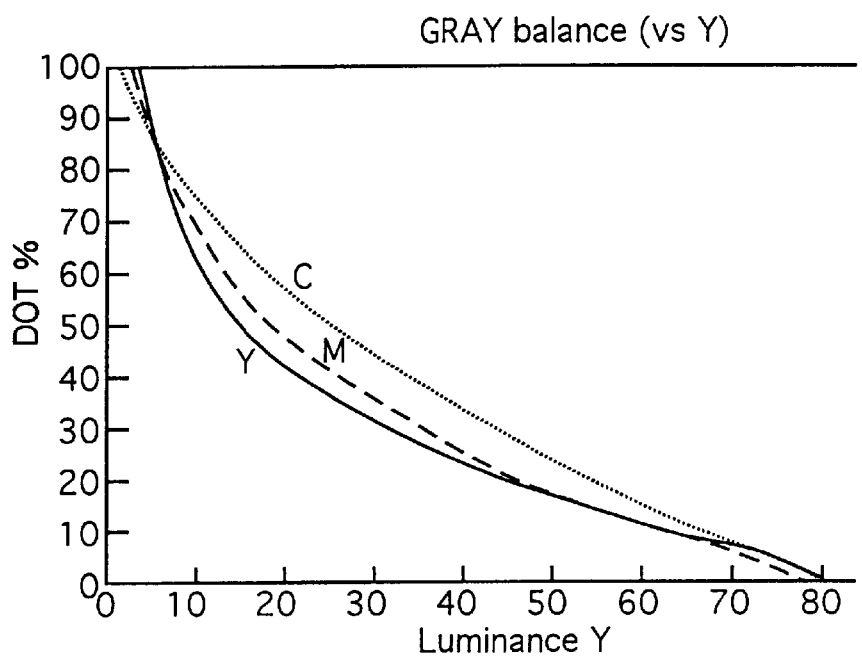
FIG. 2A is an exemplary graph plotting the equivalent neutral ink value (DOT %) against luminance Y.
Figure 2B:
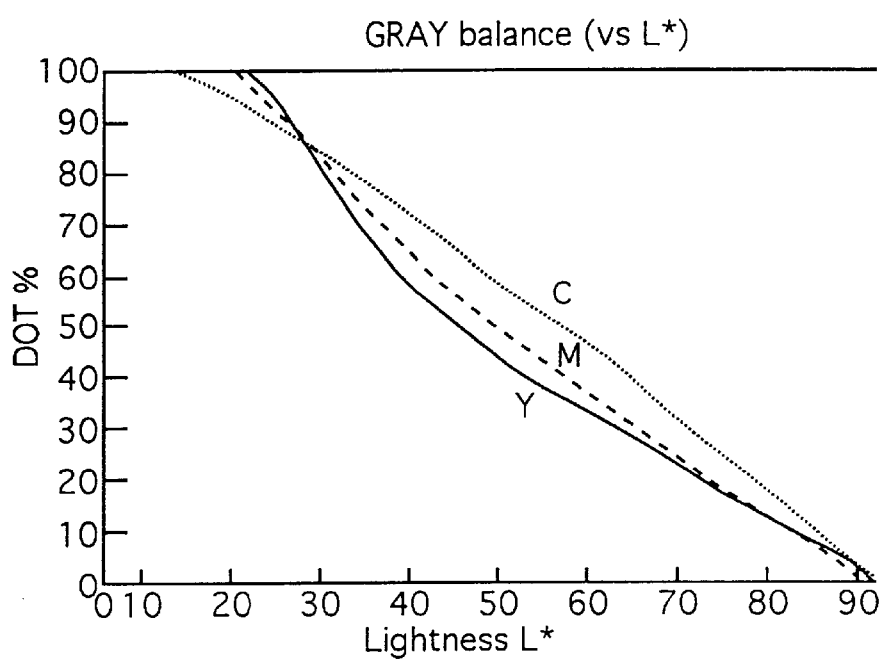
FIG. 2B is an exemplary graph plotting the equivalent neutral ink value (DOT %) against lightness L*.

Thus, a mapping function can be constructed for the equivalent neutral ink value and gradation (e.g. L*). It should here be remembered that the scale of lightness (L*), light quantity (Y) or luminance (Y) is used as a gradation correction curve in the present invention. The characteristic quantity that can be used in the invention to represent gradation is not limited to L* and any other parameters including (equivalent neutral) density and Y or Y/Yo which are close to (equivalent neutral) luminance may be substituted. If it is necessary to accomplish precise reproduction of gradations ranging from highlights to intermediate tones, a scale linear to lightness (L*) is preferred over a scale linear to light quantity (Y). This is because the quantization level differs from one gradation portion to another. FIGS. 2A and 2B plot the equivalent neutral ink value ENIV against luminance Y and lightness L*, respectively; obviously, the plot against L* (FIG. 2B) shows better resolution of device data in the range from highlights to intermediate tones.

Performed in the next step is determination of the range over which the equivalent neutral device data under each of the conditions A and B can be mapped to a gradation correction curve. To this end, the limits of gradation range are defined by a maximum device value that can theoretically be reproduced under each condition, for example, a maximum density under each condition in the case of printing, and by a minimum device value, for example, a minimum density under each condition in the case of printing, namely, the support paper.

Figure 3:
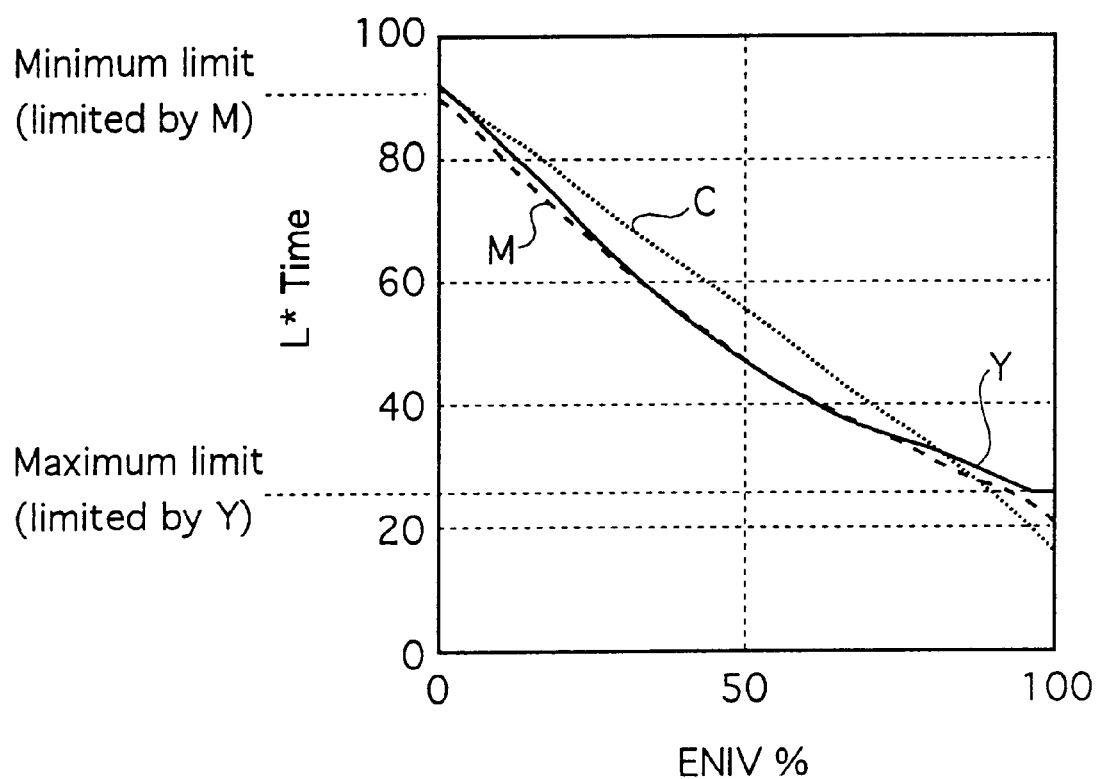
FIG. 3 is a graph illustrating an example of gradation reproduction limits to be used in the method of the invention.

Briefly, in the case described above, the gradations under each printing condition are limited by a maximum ink value and a minimum ink value (on paper) and the gradation range is determined on the basis of these limitations. As FIG. 3 shows, the upper and lower limits of reproduction under a certain condition are determined at the point of time when any one of C, M and Y exceeds 100% or becomes smaller than 0% in terms of device data (ink value). In the particular case shown in FIG. 3, Y (yellow) exceeds 100% ENIV at the earliest time (at the greatest value), so the maximum limit of gradation (L*) is determined by Y even if C (cyan) and M (magenta) are yet to exceed 100% ENIV. On the other hand, the minimum limit of gradation (L*) is determined by M. This is because the device data exceeding 100% or smaller than 0% cannot be output, or reproduced.

Figure 4D:
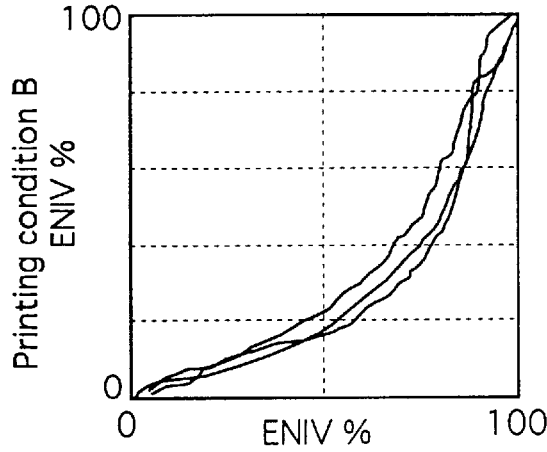
FIG. 4D is a graph showing an example of the resulting mapping function.

In the last step of the invention method, the functions of mapping from the equivalent neutral attribute data to the gradation correction curve under any two conditions are combined with the intermediary of the gradation curve, thereby constructing a function of one-to-one mapping between the equivalent neutral attribute data for each color component under any two conditions. In the case described above, this can be accomplished by combining the constructed functions of mapping from the equivalent neutral ink value (ENIV) to gradation curve (L*) under the two conditions so as to construct the function of mapping from equivalent neutral ink value (device value) to equivalent neutral ink value (device value) with the intermediary of the gradation curve. FIGS. 4A, 4B and 4C are graphic representations of the mapping relationships described hereinabove and the functions of mapping from equivalent neutral ink value to gradation curve (L*) under the printing conditions A and B which are shown in FIGS. 4C and 4B, respectively, are combined via the gradation curve transformation function shown graphically in FIG. 4A. The result of combination is the function of mapping from ENIV to ENIV as shown in FIG. 4D. FIGS. 10A, 10B, 10C and 10D correspond to FIGS. 4A, 4B, 4C and 4D and show the relationship of mapping between ENIV, gradation (Y) and ENIV, with the intermediary of the gradation curve (Y) representing the gradations in terms of luminance (Y), as well as the function of mapping from ENIV to ENIV constructed by combination of the relationship of mapping between ENIV, gradation (Y) and ENIV.

Figure 5:
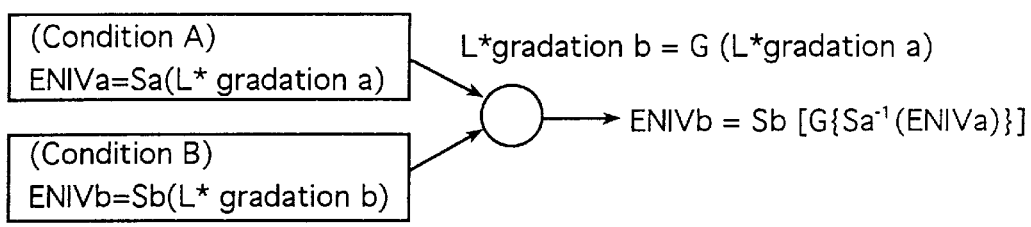
FIG. 5 shows an exemplary flow for combining two functions of mapping to equivalent neutral ink value in the color transforming method of the invention.

FIG. 5 shows the flow of combining mapping functions. In FIG. 5, ENIVa and ENIVb represent the equivalent neutral ink values under printing conditions A and B, respectively. If the gradations under the respective printing conditions are written as L*GRADATIONa and L*GRADATIONb and the respective mapping functions as Sa and Sb, ENIVa and ENIVb are expressed by the following equations (7) and (8):

$$ENIVa = Sa(L^*GRADATIONa) \tag{7}$$

$$ENIVb = Sb(L^*GRADATIONb) \tag{8}$$

It should be noted that eqs. (7) and (8) represent the relationships shown graphically in FIGS. 4C and 4B, respectively.

If the function of mapping from L*GRADATIONa to L*GRADATIONb is written as G, the gradation curve shown graphically in FIG. 4A is expressed by the following equation (9):

$$L^*GRADATIONb = G(L^*GRADATIONa) \tag{9}$$

If the inverse mapping of eq. (7) is substituted into eq. (9) and the resulting equation is substituted into eq. (8), one can determine the function of mapping between the equivalent neutral ink values (device values) under the two printing conditions A and B, as expressed by the following equation (10):

$$ENIVb = Sb\{G\{Sa^{-1}(ENIVa)\}\} \tag{10}$$

Specific formats of this function may be determined by using a multiple regression equation or the like for each color component.

By performing color transformation between two printing conditions in the manner described above, the present invention ensures that with the calorimetric gray balance being preserved under each printing condition, the overall gradation is compressed and mapping is effected centering on the compressed gradation and, in addition, transformation is effected within the range of device data, thereby ensuring that the reproduced gradations will not go beyond the intended gamut with non-gray colors being transformed naturally while preserving their positions relative to the central gray.

Adjustment for the reproduction of subtle gradations can easily be effected by changing the gradation curve shown graphically in FIG. 4A, namely, the mapping function G expressed by eq. (9). More conveniently, the gradient of the intermediate portion of the gradation curve at issue may be changed, with both ends being fixed as limited by the maximum and minimum ink values obtained in the step of determining the limits of the gradation range. Since this method is completely neutral to the balance of ENIV, only the desired gradations can be altered without affecting the gray balance and the hue.

Figure 6A:
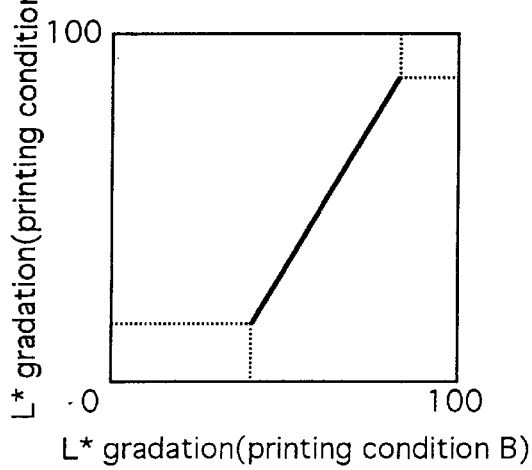
FIGS. 6A and 6B are graphs showing two gradation mapping functions having different intensities.
Figure 6B:
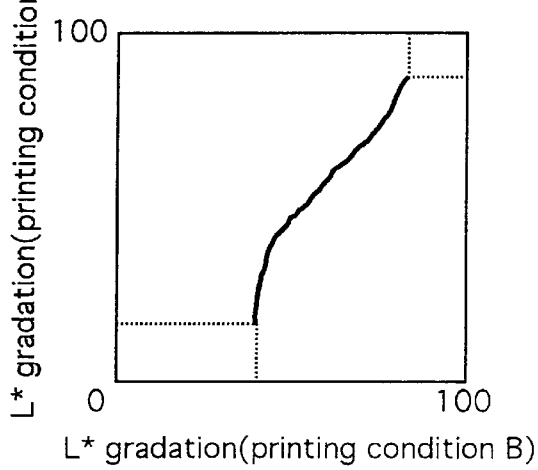

Generally speaking, if transformation is to be made from a wide range of gradations (L* in the case under consideration) to a narrow range, S-curve mapping as shown in FIG. 6B which preserves the intermediate range of gradations at higher resolution is preferably substituted for linear mapping of the type shown in FIG. 6A, with greater emphasis being placed on the intermediate tones where the important image components of interest are located. Consider, for example, the case of reproducing the image on a film original by printing; since the density range of a print is only about 2.0 whereas the film original has a density range of about 3.0, the image data read with a scanner has to be subjected to the compression of color space in order to achieve the intended reproduction. Speaking of the important image of interest such as the principal subject on the film original, it lies in the range from intermediate tones to one slightly up close to highlights; if linear mapping of the type shown in FIG. 6A is performed, uniform compression occurs to provide a generally flat impression and the color reproduction of the important image is no longer appropriate, yielding only deteriorated appearance. To deal with this problem, appropriate color reproduction of the important image is preferably effected by performing mapping as shown in FIG. 7B in combination with the S-curve mapping shown in FIG. 6B where the middletone portion containing the important image are subjected to a minimum degree of compression whereas the highlights and the shadows are sacrificed to be reproduced at lower resolutions.

Figure 7A:
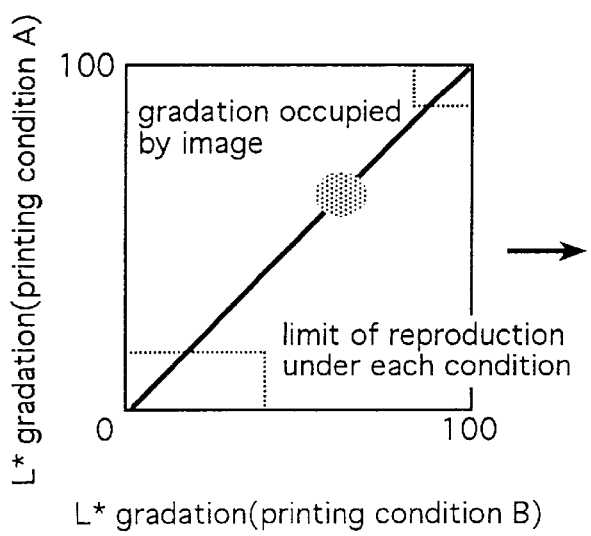
FIGS. 7A and 7B illustrate how a gradation mapping function may be adjusted for gradation reproduction.
Figure 7B:
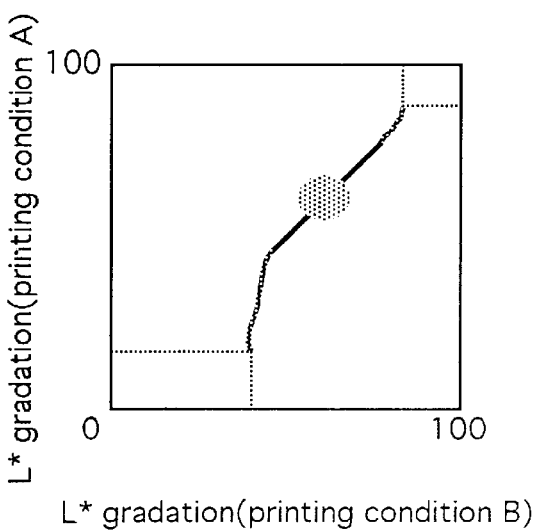

It should also be noted that in order to determine a function of transformation between gradation curves which is optimal for two conditions as exemplified by the S-curve mapping shown in FIG. 6B, the ranges of gradation correction curves and the ratio of their compression are preferably employed as shown in FIGS. 7A and 7B. Stated specifically, gradation curves are first determined such as to provide a gradation reproduction ratio of 1:1 under two conditions A and B and then the portion of gradations occupied by the important image is extracted. The gradations occupied by the important image as noted in FIG. 7A is in the middletone portion which is slightly offset from the center toward the highlights and marked off in halftone. Subsequently, the limits of gradation reproduction are determined not only for the highlights but also for the shadows under the two conditions A and B. Thereafter, as shown in FIG. 7B, with the middletone portion being preserved as it contains the gradations occupied by the important image, both ends of that portion are connected by means of smooth curves extending up to the points where they cross the limits of gradation in the highlights and shadows. In this way, the S-curve mapping of the types shown in FIGS. 6B and 7B can be obtained.

This means that the curvature of the connecting curves can also be determined by the ratio of the ranges of gradation that can be reproduced and the gradation occupied by the important image. It should also be noted that the gradation occupied by the important image can be easily determined by taking a density histogram or the like of the image. As already mentioned, the middletone portion to be preserved is connected by smooth curves to both limit areas to be reproduced with a view to generating S-curve mapping and this can be accomplished by applying various known methods including Hermite interpolation and other methods of interpolation, as well as quadratic curve approximation and other polynomial approximation methods. This not only provides ease in changing gradations but also enables automation to construct gradation curves that are either appropriate or adapted to a specific request of the user.

Thus, transformation between two conditions can be accomplished in such a way that the gamut (of gradations) is compressed while preserving the gray balance but without performing complex calculations outside the gamut and, in addition, the gradation reproducing characteristics can be altered with the gray balance being fixed. It should be noted here that the function of mapping between equivalent neutral ink values (device values) under the two conditions may typically be expressed for each color component by the following general formula (11) of transformation from CMYK to C'M'M'Y'K':

$$C' = a_{C_0}C^n + a_{C_1}C^{n-1} + \ldots + a_{C_{n-1}}C + a_{C_n}C_0$$

$$M' = a_{M_0}M^n + a_{M_1}M^{n-1} + \ldots + a_{M_{n-1}}M + a_{M_n}M_0$$

$$Y' = a_{Y_0}Y^n + a_{Y_1}Y^{n-1} + \ldots + a_{Y_{n-1}}Y + a_{Y_n}Y_0 \quad (11)$$

In other words, the calculations per se for color transformation can be accomplished by linear transformation from C, M, Y, K to C', M', Y', K' and this permits very fast transformation under smaller loads, requiring easy device implementation.

In a particularly preferred embodiment of the invention, easy and fast processing can be accomplished under various conditions and to this end, the relationships of mapping between equivalent neutral attribute data, such as equivalent neutral ink value (ENIV) for different combinations of conditions such as device, color material, media and reproducing condition, and gradation (gradation correction curve) are stored in the form of a function library (i.e., the mapping relationships are stored as coefficients to prepare profiles) and suitable mapping functions are accessed at an appropriate time prior to the calculations; then, the individual processing steps described hereinabove are performed to implement the color transforming method of the invention.

It should also be noted that the conditions to be subjected to color transformation by the method of the invention may be of any attributes that need be subjected to different modes of color reproduction in the representation of colors, as exemplified by device condition (i.e., whether the device is a printer and the like which output hard copies or a CRT, liquid-crystal display device and the like which output soft copies), color material condition (i.e., whether the color material is an ink, an emulsion, a toner or the like), media condition (i.e., whether the medium is paper) and reproducing condition (i.e., whether reproduction is effected by area modulation or density modulation).

While the color transforming method of the invention has been described above in detail, it should be noted that the foregoing embodiments are not the sole case of the invention and various improvements and modifications can of course be made without departing from the scope and spirit of the invention.

As described above in detail, the color transforming method of the invention is referenced to equivalent neutral device attribute data such as equivalent neutral ink value, equivalent neutral density and equivalent neutral luminance as against the gradation characteristics under the two conditions of interest and this contributes to the preservation of gray balance. The invention offers an added advantage in tone reproduction in that the coordinates of a color space relative to the gray axis are sufficiently preserved to compensate for the fogging and contamination which would otherwise occur in unmodified mapping. As a result, the invention ensures easy accomplishment of ideal color reproduction in such a way that the intended finish of the initial condition is preserved to reproduce very natural colors while making maximum use of the color space to which the initial condition is to be transformed.

According to a further advantage of the invention, the intended transformation is performed on data in a device-inherent space, so there is no possibility of deviation from the finite and reproducible color space of the device of interest. In addition, no complex calculations are required by different zones of the color gamut and the necessary compression or extension can be effected centering on the gray.

The entity of the transformation function used in the invention resolves itself into a simple linear combination formula and this provides for very fast calculations in transformation.

Furthermore, according to the invention, gradation transformation can also be accomplished in a unique and optimal manner using the effective ranges of equivalent neutral attribute data such as equivalent neutral ink value, density and luminance that can be actually reproduced under the respective printing conditions of interest.

Correction of the gradation characteristics is easy to effect since it can be accomplished in terms of equivalent neutral attribute data such as equivalent neutral ink value, density and luminance and the result of the correction has no adverse effects on the gray balance or tones.

According to a further benefit of the invention, the correlationships between equivalent neutral attribute data, such as equivalent neutral ink value, density and luminance under any two conditions, and the gradation ranges that can be effectively reproduced, say, printed are stored as function profiles and appropriate correlationships are accessed upon transformation between the desired conditions so as to construct the appropriate transformation function.

What is claimed is:

1. A color transforming method which performs color correction between reproduced images under differing conditions, the method comprising the steps of:
   1) calculating the colorimetric color reproducing characteristics under each condition;
   2) determining equivalent neutral attribute data from each of said color reproducing characteristics;
   3) determining the mapping of said equivalent neutral attribute data with respect to lightness, luminance or light quantity;
   4) using the scale of said lightness, luminance or light quantity as a gradation correction curve;
   5) determining, on the basis of a maximum and a minimum device value that can be reproduced under each of said conditions, the range over which mapping from said equivalent neutral attribute data to the gradation correction curve is possible;
   6) varying the characteristics of the gradation correction curves for said two conditions so as to change the intensity of the mapping function and determine the function of transformation between gradation curves; and
   7) combining the functions of mapping from the equivalent neutral attribute data to the gradation correction curve under said two conditions with the intermediary of the determined function of transformation between gradation curves, thereby constructing a function of one-to-one mapping for each color component between the equivalent neutral attribute data under said two conditions.

2. The color transforming method according to claim 1, wherein the type of said conditions is at least one condition selected from the group consisting of device condition, media condition and reproducing condition.

3. The color transforming method according to claim 1, wherein said equivalent neutral attribute data is an equivalent neutral density, equivalent neutral luminance or equivalent neutral ink value.

4. The color transforming method according to claim 1, wherein said maximum device value is a maximum density under each of said conditions in printing and said minimum device value is a paper support in printing.

5. The color transforming method according to claim 1, wherein an optimum function of transformation between the gradation curves for said two conditions is determined from the ranges of said gradation correction curves and the ratio of their compression.

6. The color transforming method according to claim 1, wherein an image reproduced under one condition is transformed to an image of reproduction under the other condition using said mapping function for each color component.

7. The color transforming method according to claim 1, wherein the relationship of mapping between the equivalent neutral attribute data and the gradation correction curve under each of said conditions is stored as a function library, accessed prior to processing and processed by the respective steps 1)–7).

8. The color transforming method according to claim 1, wherein under each condition, said equivalent neutral attribute data is determined by a reverse operation of said color reproducing characteristics of said condition in which a relation of L * set of (C, M, Y) is determined.

9. A color transforming method that performs color correction between an image reproduced under a first reproduction condition and said image reproduced under a second reproduction condition, wherein said first reproduction condition and said second reproduction condition are different reproduction conditions and wherein the method comprises:

(a) calculating first color reproducing characteristics for reproducing said image under said first reproduction condition;

(b) calculating second color reproducing characteristics for reproducing said image under said second reproduction condition;

(c) determining first equivalent neutral attribute ("ENA") data from said first color reproducing characteristics;

(d) determining second ENA data from said second color reproducing characteristics;

(e) mapping said first ENA data with respect to a first lighting characteristic and using a scale of said first lighting characteristic as a first gradation correction curve;

(f) mapping said second ENA data with respect to a second lighting characteristic and using a scale of said second lighting characteristic as a second gradation correction curve;

(g) determining a transformation function for transforming between said first gradation correction curve and said second gradation correction curve; and (h) determining a function for mapping between said first ENA data and said second ENA data based on a mapping between said first ENA data and said first gradation correction curve, said transformation function for transforming between said first gradation correction curve and said second gradation correction curve, and a mapping between said second gradation correction curve and said second ENA data.

10. The method as claimed in claim 9, wherein said first lighting characteristic and said second lighting characteristic are one of lightness, luminance, and light quantity.

11. The method as claimed in claim 9, wherein said first reproduction condition is one of a first device reproduction condition, a first media reproduction condition, and a first reproducing condition, and wherein said second reproduction condition is one of a second device reproduction condition, a second media reproduction condition, and a second reproducing condition.

12. The method as claimed in claim 9, wherein said first and second ENA data are one of equivalent neutral density data, equivalent neutral luminance data, and equivalent neutral ink value data.

13. The method as claimed in claim 9, wherein said first and second gradation correction curves are formed by determining, based on a maximum device value and a minimum device value that can be reproduced under said first and second reproduction conditions, a range over which mapping from said first and second ENA data to said first and second gradation correction curves is possible.

14. The method as claimed in claim 13, wherein said maximum device value is a maximum density under said first and second reproduction conditions in printing and said minimum device value is a paper support value in printing.

15. The method as claimed in claim 9, wherein said transformation function between said first gradation correction curve and said second gradation curves is determined from ranges of said first and second gradation correction curves and a ratio of compression of said first and second gradation correction curve.

16. The color transforming method according to claim 9, wherein said first ENA data is determined by a reverse operation of said first color reproducing characteristics of said condition in which a relation of L * set of (C, M, Y) is determined, and wherein said second ENA data is determined by a reverse operation of said second color reproducing characteristics of said condition in which a relation of L * set of (C, M, Y) is determined.

17. The color transforming method according to claim 9, wherein said function for mapping between said first ENA data and said second ENA data is a one-to-one mapping function.

* * * * *